United States Patent [19]

Henton

[11] Patent Number: 4,713,420

[45] Date of Patent: Dec. 15, 1987

[54] ABS COMPOSITIONS HAVING TRIMODAL RUBBER PARTICLE DISTRIBUTIONS

[75] Inventor: David E. Henton, Midland, Mich.

[73] Assignee: The Dow Chemical Company, Midland, Mich.

[21] Appl. No.: 380,786

[22] Filed: May 21, 1982

[51] Int. Cl.$^4$ .................. C08L 47/00; C08L 51/04; C08L 55/02

[52] U.S. Cl. .................. 525/236; 525/67; 525/68; 525/70; 525/71; 525/72; 525/75; 525/76; 525/77; 525/80; 525/81; 525/139; 525/170; 525/171; 525/203; 525/210; 525/215; 525/217; 525/228; 525/234; 525/235; 525/237; 525/238; 525/239; 525/240; 525/905

[58] Field of Search .................. 525/70, 71, 80, 210, 525/215, 232, 217, 228, 234, 237, 240, 203

[56] References Cited

U.S. PATENT DOCUMENTS

| | | | |
|---|---|---|---|
| 3,170,964 | 2/1965 | Grabowski | 525/71 |
| 3,576,910 | 4/1971 | Jastrzebski | 525/71 |
| 3,652,721 | 3/1972 | Dalton et al. | 525/71 |
| 3,663,656 | 5/1972 | Ford et al. | 525/71 |
| 3,825,621 | 7/1974 | Ford | 525/71 |
| 3,903,199 | 9/1975 | Dalton | 525/71 |
| 3,903,200 | 9/1975 | Cincera | 525/71 |
| 3,905,237 | 4/1970 | Aubrey | 525/71 |
| 3,905,238 | 4/1970 | Aubrey et al. | 525/71 |
| 3,928,494 | 12/1975 | Alberts | 525/71 |
| 3,928,495 | 12/1975 | Dalton | 525/71 |
| 3,931,356 | 1/1976 | Dalton | 525/71 |
| 4,009,226 | 2/1977 | Ott et al. | 525/71 |
| 4,009,227 | 2/1977 | Ott et al. | 525/71 |
| 4,017,559 | 4/1977 | Deets et al. | 525/71 |
| 4,221,883 | 9/1980 | Mott et al. | 525/71 |
| 4,224,419 | 9/1980 | Swoboda et al. | 525/71 |
| 4,233,409 | 11/1980 | Buckley | 525/71 |
| 4,250,271 | 2/1981 | Morris | 525/71 |
| 4,277,574 | 7/1981 | Jastrzebski et al. | 525/71 |
| 4,430,478 | 2/1984 | Schmitt et al. | 525/71 |

Primary Examiner—Jacob Ziegler

[57] ABSTRACT

Rubber modified styrene-acrylonitrile polymers (ABS) having three different types of rubber particles. One type is small, usually emulsion-produced particle. The second is a large emulsion-produced particle. The third is a large, mass-produced particle. Such compositions exhibit good combinations of toughness and gloss.

10 Claims, No Drawings

ABS COMPOSITIONS HAVING TRIMODAL RUBBER PARTICLE DISTRIBUTIONS

BACKGROUND OF THE INVENTION

It is well known in the art that various relatively rigid and/or brittle interpolymers of monovinylidene aromatic monomers with ethylenically unsaturated nitrile monomers can be made more impact resistant by the inclusion of amounts of various types of elastomeric materials (rubbers) into a matrix or continuous phase of said interpolymer material. Usually, the elastomeric materials are in the form of discrete particles, such particles having amounts of the matrix interpolymer, or an inter- or homopolymer similar thereto, graft-polymerized to the particles. These types of rubber-modified, impact-resistant polymeric compositions are commonly known and referred to as graft copolymers or polyblends. Among the best known of these types of compositions are the ABS or ABS-type compositions. Compositionally, ABS or ABS-type compositions generally comprise a combination of an elastomer usually containing polymerized butadiene, with a rigid interpolymer of monovinylidene aromatic monomer with ethylenically unsaturated nitrile monomer. Structurally, ABS or ABS-type compositions usually consist of the rigid, matrix or continuous phase having dispersed therein particles of the elastomer, such particles usually having grafted thereto amounts of the rigid interpolymer or a similar inter- or homopolymer.

It is also well known in the art that the physical properties of these types of compositions are greatly affected by the relative amounts of elastomer particles having different sizes and particle structures. Larger rubber particles having diameters greater than about 0.5 micron ($\mu$) contribute greatly to impact resistance but tend to reduce the gloss of articles formed or molded from compositions containing them especially in the case of the below-described mass particles. On the other hand, when smaller modifying-rubber particles are used in polymer compositions, articles formed therefrom tend to be glossier but are less impact resistant than if the same amount of rubber was used in the form of larger particles.

Furthermore, concerning the structures of the individual rubber particles (i.e., rubber particle morphology) there are well-known advantages and disadvantages accompanying the use of either of the two main rubber-particle types in rubber-modified polymer compositions. It is generally believed that grafted rubber particles containing occlusions of matrix polymer therein, one of the two main rubber-particle types, provide more impact resistance than the same amount of rubber in the form of similarly grafted, solid rubber particles, the other main particle type. Such grafted, occlusion-containing rubber particles are usually formed and grafted in a mass-type or mass-suspension-type polymerization where a previously-produced rubber is dissolved in an amount of polymerizable monomer or in a mixture or solution of polymerizable monomer(s) with optional diluents, which monomer(s) are thereafter polymerized. Occlusion-containing particles, produced in such mass, mass-solution or mass-suspension processes or variations of these processes are hereafter referred to as "mass particles". It is difficult, however, using available types of rubber and mass process equipment to produce groups of mass particles having average diameters less than 0.5$\mu$.

It is also well known in the art that mass particles present in rubber-modified polymeric compositions can have a very detrimental effect on the gloss of articles formed therefrom. In spite of the disadvantages of mass particles, however, they are a very desirable constituent of rubber-modified polymer compositions. One basis for their desirability is that, probably due to their occluded structure, they provide a great deal of impact resistance for the amount of rubber which is actually included. Other desirable facets of including mass particles in rubber-modified polymer compositions include the ability to utilize a wide variety of rubber compositions and types and the economy and efficiency of the mass-type processes by which they are formed.

The other main type of rubber particle morphology (i.e., the above-mentioned "solid" or non-occluded rubber particles) is usually achieved via emulsion polymerization of the rubber in an aqueous latex. After the rubber is made, monomers which are polymerizable and graftable (e.g., styrene and acrylonitrile) are usually added to the rubber-containing latex and polymerized to form the graft portion as well as amounts of matrix polymer. The non-occluded type of rubber particles, produced via emulsion polymerization process, are hereinafter referred to as "emulsion-particles". When these emulsion particles have been grafted with a different, relatively rigid polymer, but still have a high rubber concentration, at least about 30 weight percent or so, these compositions are very suitable for blending with additional amounts of the same or different rigid polymer, optionally containing additional amounts of rubber, to achieve desired rubber contents in the resultant compositions. Such blendable intermediates are often referred to as "grafted rubber concentrates" or "GRC's" and can be used to produce a wide variety of rubber-modified polymer compositions.

Under most circumstances, however, emulsion polymerization techniques are generally economically feasible for the production of rubber particles having diameters less than about 0.25$\mu$ or so. Such particles must usually be agglomerated or coagulated in some way before, during and/or after grafting in order to achieve rubber particles having diameters greater than about 0.5 $\mu$. Agglomerating and coagulating techniques are well known in the art. See, for example, U.S. Pat. Nos. 3,551,370; 3,666,704; 3,956,218 and 3,825,621; all of which are included herein by reference. A particularly desirable technique for the controlled agglomeration of the particles of an emulsion-prepared rubber in an aqueous dispersion is taught in the pending U.S. patent application, Ser. No. 350,849, filed Feb. 2, 1982, entitled "Particle Agglomeration in Rubber Latices" by D. E. Henton and T. M. O'Brien, which application is incorporated herein by reference.

As is obvious from the above discussion, and well known in the art, emulsion polymerization techniques are well-suited for preparation of smaller rubber particles while mass-type processes or agglomeration of smaller, emulsion particles can be used to achieve large particle sizes.

As is also generally known in the art, there are other individual characteristics of rubber particles, once the desired size has been determined, which can be conveniently and separately controlled to optimize certain properties of the rubber-modified polymer compositions to which they are added. Some parameters which are subject to quite wide variation to affect the physical properties of the resultant compositions include the molecular weight of the mass rubber, the degree to which either mass or emulsion rubber is crosslinked and the amounts and types of different polymers which are grafted to the particles.

In view of these phenomena observed in the production of ABS and ABS-type compositions, a great deal of effort has gone into achieving optimized physical properties by tailoring the rubber particle distributions (i.e., the sizes and types of rubber particles and the amounts of different size and/or type rubber particles) in the ABS and ABS-type compositions. See, for example, representative U.S. Pat. Nos. 3,509,237; 3,576,910; 3,652,721; 3,663,656; 3,825,621; 3,903,199; 3,903,200; 3,928,494; 3,928,495; 3,931,356; 4,009,226; 4,009,227; 4,017,559; 4,221,883; 4,224,419; 4,233,409; 4,250,271 and 4,277,574; wherein various "bimodal" particle size distributions are disclosed. As used in the art and herein, a composition having a "bimodal" particle size distribution contains two distinct groups of rubber particles, each group having a different average particle size.

The teachings of most of these patents can be broadly characterized as teaching that gloss and impact resistance are inversely related and that a gain in one is usually achieved only with a loss in the other. Most of them teach that a substantial percentage of the rubber particles must be of the small, emulsion-produced type to yield satisfactory, glossy, impact-resistant ABS and ABS-type compositions. Most important, however, is the fact that none of them teach or suggest that small, emulsion-prepared particles can advantageously be combined with both mass-produced large particles and agglomerated, emulsion-produced large particles to produce compositions having improved impact resistance and good gloss.

OBJECTS OF THE INVENTION

An object of the present invention is to provide rubber-modified polymeric compositions, comprising mass rubber particles, having good combinations of gloss and impact-resistance. Another object of the present invention is to provide rubber-modified polymeric compositions having improved toughness without a large sacrifice of gloss. It is also an object to provide rubber-modified polymer compositions having very high gloss and good toughness. It would also be desirable to have rubber-modified polymer compositions wherein good toughness could be obtained while gloss is minimized.

SUMMARY OF THE INVENTION

These objects and other advantages are achieved in an improved rubber-modified, impact-resistant polymeric composition comprising:

(a) a matrix comprising an interpolymer comprising monovinylidene aromatic monomer and ethylenically unsaturated nitrile monomer polymerized therein; and (b) dispersed in such matrix in the form of discrete particles, from about 5 to about 40 weight percent, based on weight polymeric composition, of elastomeric material (rubber), wherein the improvement comprises the dispersed rubber comprising the following three rubber components:

(1) a small-particle rubber component being from about 1 to about 94 weight percent of the rubber, the particles of this component having a volume average diameter of from about 0.05 to about 0.25 microns ($\mu$);

(2) a large emulsion particle rubber component being from about 1 to about 80 weight percent of the rubber, the particles of this component having a volume average diameter of from about 0.4 to about 2 $\mu$; and (3) a large mass particle rubber component being from about 5 to about 95 weight percent of the rubber, the particles of this component having a volume average diameter of from about 0.5 to about 10$\mu$.

DETAILED DESCRIPTION OF THE INVENTION

The present invention comprises two essential elements: (a) the monovinylidene aromatic/ethylenically unsaturated nitrile interpolymer in the matrix or continuous phase and (b) the particulate elastomeric material (rubber) dispersed in the matrix, the elastomeric material in turn comprising three components. In addition, there is generally an amount of so-called "superstrate" polymer, be it interpolymer or homopolymer, graft polymerized or grafted onto the rubber particles or substrate. There is also an amount of polymer occluded within the mass particles in addition to the amounts grafted thereto. It should be noted that as used herein the terms "polymer" and "polymerization" are generic, and can include either or both of the more specific cases of "homo- and interpolymer" and "homo- and interpolymerization", respectively.

The matrix or continuous phase of the present invention (i.e. the non-elastomeric, non-grafted and non-occluded portion) consists at least principally of an interpolymer comprising polymerized therein monovinylidene aromatic monomer and ethylenically unsaturated nitrile monomer. Since the most common example of these interpolymers is poly(styrene-acrylonitrile), also known as SAN, these compositions are generically known as SAN-type compositions or more simply as SAN. In general, the matrix portion of the present invention comprises at least about 50 percent by weight, preferably at least about 65 percent by weight, more preferably at least about 90 percent by weight of the interpolymer comprising monovinylidene aromatic and ethylenically unsaturated nitrile monomers polymerized therein. The balance of the matrix volume can be made up of (1) comonomers interpolymerized into the interpolymer comprising monovinylidene aromatic and ethylenically unsaturated nitrile monomers polymerized therein; (2) additional non-elastomeric polymeric material combined therewith and/or (3) other filler-type materials.

As is well known in the art, as the molecular weight of matrix polymer (as well as that of the grafted polymer) increases, the toughness of the resultant rubber-modified polymer composition increases while the gloss and flow tend to be decreased.

It has been found that the weight average molecular weight ($M_w$) of all of the matrix (ungrafted) polymer, from all sources should be from about 40,000 to about 300,000, preferably from about 70,000 to about 200,000. In other words, the $M_w$'s of the ungrafted, unoccluded polymer included in the present rubber-modified polymer compositions; which amounts of polymer (a) can be produced during the grafting of the small particles, (b) can be produced during the grafting of the large emulsion particles, (c) can be produced during the grafting of the large mass particles and/or (d) can be from other sources of ungrafted matrix polymer; will average out to be within the desired range.

Exemplary of the monovinylidene aromatic hydrocarbons which, in polymerized form, may be included in compositions according to the present invention are styrene; alpha-alkyl monovinylidene monoaromatic compounds (e.g., alpha-methylstyrene, alpha-ethylstyrene, alpha-methylvinyltoluene, alpha-methyl dialkylstyrenes, etc.); ring-substituted alkyl styrenes (e.g., ortho-, meta-, and paravinyl toluene; o-ethylstyrene; p-ethylstyrene; 2,4-dimethylstyrene; p-tertiarybutyl styrene; etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be included are acrylonitrile, methacrylonitrile, ethacrylonitrile, and mixtures thereof. The unsaturated nitrile is generally employed in the matrix interpolymer in an amount of from about 5 to about 50, preferably from about 15 to about 35 weight percent based on the total weight of monovinylidene aromatic monomer and ethylenically unsaturated nitrile monomer employed in preparing the interpolymer containing those two monomers.

In addition to monovinylidene aromatic monomers and ethylenically unsaturated nitrile monomers, various additional monomers may be desirably included, in polymerized form, in the rubber-modified polymer compositions according to the present invention. Exemplary of such additional monomers are conjugated 1,3 dienes (e.g., butadiene, isoprene, etc.); alpha- or beta-unsaturated monobasic acids and derivatives thereof (e.g., acrylic acid, methyl acrylate, ethyl acrylate, butyl acrylate, 2-ethylhexyl acrylate, methacrylic acid and the corresponding esters thereof such as methyl methacrylate, etc., acrylamide, methacrylamide); vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included will vary as the result of various factors. The amount of such monomers employed will generally be less than about 10 weight percent based on the total weight of the monomers employed in preparing the non-rubber, polymeric portions of the rubber-reinforced product.

The various includable monomers can be incorporated into compositions according to the present invention in any or all of several ways. For example, one or more of the additional monomers may be interpolymerized into monovinylidene aromatic/ethylenically unsaturated nitrile interpolymer. One or more of the includable monomers can be graft polymerized onto, and in the case of mass particles, polymerized and occluded within, the rubber particles. In addition, one or more of the includable monomers can be otherwise polymerized into polymeric components which can be combined into rubber-modified polymer compositions according to the present invention.

In one embodiment of the present invention, it has been found that methyl methacrylate can advantageously be included in compositions according to the present invention, in polymerized form, in any or all of the above-described manners in amounts of from about 1 to about 40 weight percent based on the total weight of the polymerized monovinylidene aromatic, ethylencially unsaturated nitrile and methyl methacrylate monomers present therein in matrix, grafted and/or occluded polymer.

It may also be desirable to include in the present ABS or ABS-type compositions amounts of other polymers and/or copolymers such as polymers and/or copolymers of phenylene oxide, polycarbonates and polyester polycarbonates.

As will be readily appreciated, superstrate polymer, grafted to the rubber particles and interpolymer present in the matrix can have the same or different compositions as long as they are compatible. For the purposes of the present invention, an interpolymer in the matrix and a different graft polymer are considered compatible if a blend of the graft polymer with the matrix interpolymer would displace the glass transition temperature (Tg) of the matrix interpolymer. Preferentially, a blend of a graft interpolymer with a compatible matrix interpolymer exhibits a single Tg. For example, it has been found that both polymethylmethacrylate and poly(methyl methacrylate-ethyl acrylate) are suitably compatible with SAN and SAN-type polymers. The Tg of a composition is advantageously measured using a differential scanning calorimeter. With this in mind, the grafted polymer can be prepared from one or more of the monomers which are described above as suitable for inclusion into compositions according to the present invention. Preferably, however, said grafted polymer is an interpolymer compositionally similar to the matrix interpolymer.

The various techniques suitable for producing matrix polymer and the desired grafted (and occluded) polymer are well known in the art. Examples of these known polymerization processes include mass, mass-solution, mass-suspension, suspension and emulsion polymerization processes as well as other modifications and/or combinations of such processes. See, for example, U.S. Pat. Nos. 3,509,237; 3,928,494; 4,239,863; 4,243,765; and 4,250,271; which are incorporated herein by reference and teach such processes. As is obvious and well known in the art, the same reaction that is grafting homo- or interpolymer onto one or more of the rubber components can advantageously be used to produce all or part of a corresponding ungrafted homo- or interpolymer for the matrix portion. It should be noted that any production of grafted polymer, in most cases, inherently produces small amounts of ungrafted (i.e. matrix) polymer. Advantageously (1) the small, preferably emulsion, particles and large emulsion particles are grafted at the same time with monovinylidene aromatic and ethylenically unsaturated nitrile monomers and produce at the same time a small amount of ungrafted SAN or SAN-type interpolymer; (2) the grafting of the mass particles is done with the same or different monovinylidene aromatic and ethylenically unsaturated nitrile monomers in a different, separate process and produces a portion of the total ungrafted SAN or SAN-type interpolymer desired for the matrix of the final composition; (3) the balance of the ungrafted SAN or SAN-type interpolymer desired for the matrix of the rubber-modified polymer composition is produced separately; and (4) the three ingredients combined. Advantageously, the separately produced SAN or SAN-type interpolymer is produced in an economical mass or mass-solution type of polymerization process.

In graft polymerization reactions, as is well known in the art, the desired polymerizable monomers are combined with the preformed rubber substrate and the monomers then polymerized to chemically combine or graft at least a portion of the forming polymer upon the rubber substrate. Depending upon the ratio of monomers to rubber substrate and the polymerization conditions, it is possible to achieve both the grafting of the desired amount of polymer onto the rubber substrate and the polymerization of ungrafted polymer to provide all or a portion of the matrix at the same time.

Various substrate rubbers (onto which the superstrate polymer may be grafted during polymerization in the presence of such rubber) are utilizable as the small, large emulsion and large mass particles. These rubbers include diene rubbers, ethylene propylene rubbers, ethylene propylene diene (EPDM) rubbers, acrylate rubbers, polyisoprene rubbers, halogen-containing rubbers and mixtures thereof as well as interpolymers of rubber-forming monomers with other copolymerizable monomers.

The preferred rubbers are diene rubbers or mixtures of diene rubbers, i.e., any rubbery polymers (a polymer having a second order transition temperature not higher than 0° C., preferably not higher than −20° C., as determined by ASTM Test D-746-52T) of one or more conjugated 1,3-dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; a ring-substituted alkylstyrene, such as the o-, m-, and p-vinyl toluene, 2,4-dimethylstyrene, the ring-substituted ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); ring-substituted halo monovinylidene aromatic hydrocarbons (e.g., the o-, m-, and p-chlorostyrenes, 2,4-dibromostyrene, 2-methyl-4chlorostyrene, etc.); acrylonitrile; methacrylonitrile; alkyl acrylates (e.g., methyl acrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., methyl vinyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction, particularly for a mass or suspension polymerization reaction. In addition, excessive cross-linking can result in loss of the rubbery characteristics. The cross-linking agent can be any of the agents conventionally employed for cross-linking diene rubbers, for example, divinylbenzene, diallyl maleate, diallyl fumarate, diallyl adipate, allyl acrylate, allyl methacrylate, diacrylates and dimethylacrylates of polyhydric alcohols (e.g., ethylene glycol dimethacrylate, etc.), and the like.

A preferred group of rubbers are those consisting essentially of 70 to 100 percent by weight of butadiene and/or isoprene and up to 30 percent by weight of monomer selected from the group consisting of monovinylidene aromatic hydrocarbons (e.g., styrene) and unsaturated nitriles (e.g., acrylonitrile) or mixtures thereof. Particularly advantageous substrates are butadiene homopolymer or an interpolymer of 90 to 97 percent by weight butadiene and 3 to 10 percent by weight of acrylonitrile and/or styrene.

Various techniques are customarily employed for polymerizing rubber monomers including Ziegler-Natta, anionic and free radical polymerization. Free radical emulsion polymerization can be used to produce a latex emulsion which is useful as the base for emulsion polymerization of the graft polymer. See, for example, U.S. Pat. No. 4,243,765 which has been incorporated herein by reference.

In general, in compositions according to the present invention, it is desirable to have dispersed therein in the form of particles, from about 5 to about 40 weight percent rubber, based on total rubber-modified polymer composition weight, preferably from about 9 to about 23 weight percent.

The essence of the present invention is that the particulate rubber dispersed in the interpolymeric matrix comprises three different components. It has been found especially desirable for the dispersed particulate rubber to consist essentially of the three particle components. By the term "rubber particle component", it is meant a group of rubber particles of the same rubber particle type and having about the same particle size. As discussed above, the two main rubber particle types are (1) the occluded particles usually made in a mass-type process and (2) the solid, non-occluded particles usually made in an emulsion polymerization process. Each rubber component can then be characterized by the combination of the average size of the particles and the process by which they are formed. The average particle size of a rubber particle component, as used herein, refers to the volume average diameter of the group of particles making up the rubber component or particle type. In most cases, the volume average diameter of a group of particles is the same as the weight average. In the case of the emulsion-produced particles, the average particle diameter measurement is made before any of the interpolymer is grafted onto the rubber particles, while in the case of the mass particles, the size includes the polymer grafted to the rubber particles and occlusions of polymer within the particles. The volume average diameters of emulsion particle groups having average particle diameters of less than about 1 micron can be conveniently determined, as can the number average diameters and the particle size distributions, by hydrodynamic chromatography (HDC). Hydrodynamic chromatography is explained in U.S. Pat. No. 3,865,717 G. R. McGowan and Vol. 89, Issue 1 of *The Journal of Colloid and Interface Science*, 1982 at pages 94 through 96. In the case of groups of mass particles and groups of emulsion particles having average particle diameters of more than about 1 micron, the volume average diameters, number average diameters and particle size distributions can be determined by the analysis of transmission electron micrographs of the compositions containing the particles.

It is recognized, of course, that the various rubber particle components comprise particles having a range of sizes, such components not consisting of particles of only one size. The above analysis techniques indicate, however, that the particles of a particular rubber particle component generally have a fairly narrow range of particle sizes. By this it is meant that the ratio of the volume average particle diameter of a particle group to the number average particle diameter of the same particle group is generally in the range of from about 1 to about 3.5, except in the case of groups of large mass particles (e.g., groups having volume average diameters greater than about $3\mu$) where broader distributions may be desirable.

One of the rubber components in the present invention, hereinafter referred to as the small particle component, has a relatively small average particle size, the particles thereof having an average particle diameter of from about 0.05 to about $0.25\mu$, based on volume. As discussed above, these small-sized particles are most conveniently prepared by emulsion polymerizing a mixture of rubber-forming monomers to form a dispersion of uniformly sized particles of the desired size, as is well known in the art. See, for example, U.S. Pat. Nos. 3,509,237; 3,928,494; 4,243,769; and 4,250,271 which have been incorporated herein by reference and teach suitable processes. It has been found that this component advantageously has an average particle size of from about 0.08 to about 0.20 $\mu$.

The small particle component typically makes up from about 1 to about 94 weight percent of the rubber in the present invention. However, it has been found preferable to use from about 5 to about 75 weight percent while from about 25 to about 50 weight percent is especially preferable. Within these ranges, the amount of small particle rubber helps to control the gloss of the resultant polymeric composition. At constant rubber content, increasing the amount of small particle rubber increases the gloss. Reducing the percentage of small particle rubber will produce tougher resultant compositions with the loss of some gloss if such properties are desired.

It is usually desirable in grafting polymer onto the particles of this component to achieve a graft-to-rubber ratio of at least about 0.3 and preferably from about 0.3 to about 2 in order to achieve desired gloss and impact resistance in the resultant ABS or ABS-type product.

Another rubber component essentially included in the present rubber-modified compositions is referred to as the large emulsion particle component. This component has an average particle size of from about 0.4 to about 2.0 $\mu$, preferably from about 0.7 to about $1.4\mu$.

This first larger particle component typically makes up from about 1 to about 80 weight percent of the dispersed rubber, preferably from about 5 to about 50 weight percent and most preferably from about 10 to about 40 weight percent.

It has been found most desirable in this particle component to use emulsion polymerized rubber. Since, as mentioned above, most emulsion polymerization processes do not inherently produce particles this large at an economical rate, the particles of this component can be produced by agglomerating or coagulating emulsion-produced dispersions of smaller rubber particles, either before, during or after the particles are grafted. See, for example, U.S. Pat. Nos. 3,551,370; 3,666,704; 3,956,218; and 3,825,621 which have been incorporated herein and teach suitable processes.

As discussed above, within the ranges of particle types and amounts specified for this component, the use of the larger particles in this component or the larger percentages of this component will usually result in better impact-resistance in the resultant polymer composition, holding the other variables constant.

It is usually desirable to graft enough polymer onto the particles of this component to achieve a graft-to-rubber ratio of at least about 0.05 in order to balance gloss and impact properties in the resultant ABS or ABS-type composition.

The final rubber component essential to the present improved rubber-modified, impact-resistant polymer compositions is referred to as the large mass particle component. This component has an average particle size of from about 0.5 to about $10\mu$, preferably from about 0.6 to about 4 and for a high gloss product from about 0.6 to about $1.5\mu$.

This second large particle component typically makes up from about 5 to about 95 weight percent of the rubber, preferably from about 10 to about 80 and most preferably from about 10 to about 50 weight percent.

It has been found most desirable for this component to use particles resulting from a mass-type or mass-suspension-type grafting process which produces particles having grafted thereto and occluded therein amounts of a desired superstrate polymer, preferably SAN or SAN-type polymer. Such mass processes, as is well known in the art, can be very satisfactorily employed to produce rubber particles having appropriate sizes for utilization in this component. See, for example, U.S. Pat. Nos. 3,509,237 and 4,239,863 which have been incorporated herein by reference and teach suitable processes.

In general, it is usually desirable to have from about 10 to about 85, preferably from about 30 to 75, weight percent of the mass particles consist of grafted and occluded polymer, the balance being the rubber.

Within the above-described ranges, the use of this mass rubber particle component to substantially improve the impact-resistance of the resultant polymer compositions is not accompanied by the expected loss of gloss properties. In fact, compositions according to the present invention exhibit a surprising combination of gloss and impact-resistance for the sizes of the particles and the amount of rubber they contain. By slight variations in the relative amounts and/or the average particle sizes of the three rubber components, compositions can be produced having better combinations of gloss and impact-resistance than prior art compositions having similar amounts of rubber. The above teachings therefore are easily adaptable to provide compositions according to the present invention having certain desired properties optimized without much, if any, sacrifice of the other as compared to what is taught in the art.

For example, rubber-modified polymer compositions having high gloss and very good toughness can be prepared according to the present invention comprising as the modifying rubber therein:

(a) from about 20 to about 75, preferably from about 20 to about 40, weight percent small particles, preferably emulsion particles, having a volume average diameter of from about 0.08 to about $0.25\mu$, preferably from about 0.08 to about $0.2\mu$, (b) from about 10 to about 50, preferably from about 10 to about 25, weight percent large emulsion particles, preferably resulting from the agglomeration of smaller particles, having a volume average diameter of from about 0.4 to about $1.5\mu$, preferably from about 0.7 to about $1.3\mu$, and (c) from about 5 to about 70, preferably from about 50 to about 70, weight percent large mass particles having a volume average diameter of from about 0.6 to about 4μ, preferably from about 0.6 to about 0.9μ.

On the other hand compositions in which very high gloss is desired to be combined with good toughness would comprise as the modifying rubber:

(a) from about 25 to about 35 weight percent small particles, preferably emulsion particles, having a volume average diameter of from about 0.08 to about 0.2μ, (b) from about 25 to about 35 weight percent large emulsion particles, preferably resulting from the agglomeration of smaller particles, having a volume average diameter of from 0.6 to about 1.3μ, and (c) from about 35 to about 50 weight percent large mass particles having a volume average diameter of from about 0.6 to about 0.9μ.

In some situations where it is desired to have a controlled, low amount of gloss (i.e., a matte finish) this can be achieved by increasing both the amount and average particle size of the large mass particle component. Such compositions generally comprise as the modifying rubber:

(a) from about 5 to 40 weight percent small particles having a volume average diameter of from about 0.08 to about 0.25μ, (b) from about 5 to about 40 weight percent large emulsion particles, preferably resulting from the agglomeration of smaller particles, having a volume average diameter of from about 0.6 to about 2.0μ, and (c) from about 25 to about 80 weight percent large mass particles having a volume average diameter of from about 1.0 to about 8.0μ.

For some applications, it is very desirable to use relatively large amounts of rubber and produce polymer compositions having very good toughness. Such compositions can be achieved according to the present invention comprising from about 15 to about 25 weight percent rubber based on total composition weight, the rubber consisting of:

(a) from about 10 to about 20 weight percent small particles, preferably emulsion particles, having a volume average diameter of from about 0.08 to about 0.2μ, (b) from about 10 to about 20 weight percent large emulsion particles, preferably resulting from the agglomeration of smaller particles, having a weight average diameter of from about 0.7 to about 1.3μ, and (c) from about 70 to about 80 weight percent large mass particles having a weight average diameter of from about 0.65 to about 1.4μ.

EXAMPLES

The below examples of ABS compositions according to the present invention are prepared by blending together various separately prepared elements. Though many of the following examples (some of which are not examples of the present invention) are prepared in this manner, there are many variations and modifications of such techniques and many other different techniques by which compositions according to the present invention can be prepared.

When molded samples are required for the various following physical property evaluations, the compositions are injected molded on a 2 ounce Negri Bossi injection molding machine from a barrel having a temperature of from about 375° to 400° F. into a mold at a temperature of about 80° F.

Various ASTM (American Society for Testing Materials) test methods are used to evaluate the physical properties of the various following constituents and example compositions. The notched Izod impact strength (Izod) values are determined according to ASTM D-256 at 73° F. Tensile strengths at yield and rupture ($T_y$ and $T_r$, respectively) and percent elongation (%E) are determined according to ASTM D-638 at 0.2 in/min. Gardner gloss values are determined according to ASTM D-523. Melt flow rates are determined according to ASTM D-1238 under Condition I.

Gardner dart impact resistance test data is obtained for some compositions. In this test, a 3.63 kg drop weight with a fixed dart is dropped onto a round sample two inches in diameter and an eighth inch thick resting on a circular 3.2 cm opening. The dart is 1.59 cm long, the point or tip having a radis of curvature of 0.795 cm. The weight is dropped from various heights until the dart breaks through the sample. The force in inch-pounds at which the sample breaks is then determined, the maximum force achievable with the testing apparatus being 320 inch-pound. In some cases, the samples tested did not break at this maximum force and their dart impact resistance is shown at 320+.

In some of the below tables the "% gel" for some of the compositions is given. This is the percentage of the total rubber-modified polymer composition which is rubber plus polymer grafted to and occluded within the rubber. The weight of gel in a composition is determined by dissolving away the ungrafted, matrix polymer with a 50/50 mixture of toluene and methyl ethyl ketone. The weight of the remaining gel is then compared to the weight of the composition sample from which it was recovered.

In the below tables, the swelling index is given for some rubber compositions and indicates the relative degree of crosslinking in the rubber. As is well known, the swelling index is a measure of the amount of solvent a rubber can imbibe, more crosslinking in the rubber preventing the imbibing of as much solvent as a lesser crosslinked rubber could imbibe. In the case of mass particle components, the gel is recovered as described above by dissolving the matrix polymer using a 50/50 mixture of toluene and methyl ethyl ketone, then removing the solvent and dissolved polymer by centrifuging. The weight of the solvent swollen gel is determined before the solvent is removed from the gel using a vacuum oven. The swelling index is the ratio of the weight of the solvent swollen gel to the dry weight of the gel.

The process is essentially the same for emulsion produced rubber except that it is done before the rubber is grafted and the solvent used is toluene. It should be noted that some additonal crosslinking occurs later during the grafting of the emulsion rubber, which crosslinking is not reflected in the swelling index.

In some cases the ratio of the weight of the grafted SAN polymer to the weight of the rubber substrate, the ratio referred to as g/r, is given. In determining this ratio, matrix (ungrafted) polymer and occluded polymer are separated from the rubber and grafted polymer using multiple acetone extractions, then knowing the amount of rubber in the starting sample, the g/r ratio can be determined.

In general, the example compositions as listed below are prepared by blending together two or more of the following constituents, depending on the particle system desired to be achieved.

(a) Constituent A - Mass Rubber Particles

A mass particle constituent is prepared by dissolving one of the below-specified rubber compositions in a mixture of styrene, acrylonitrile and ethylbenzene, polymerizing the monomers while agitating and/or otherwise shearing to achieve the desired rubber particle size. During the polymerization some forming interpolymer is grafted to the rubber while some does not graft, but forms matrix interpolymer. In this process, as in all grafting processes, varying amounts of matrix interpolymer can be formed (in addition to the grafted portion) depending on the amounts of monomers supplied.

This constituent is then extruded, pelletized and blended with the other constituents to achieve the desired rubber particle distributions and rubber concentrations.

The different constituents containing mass rubber particles which are blended in with other constituents to achieve the desired final compositions are identified in Table I below.

TABLE I

| | | | Mass Rubber Particle Constituent Characteristics | | | | |
|---|---|---|---|---|---|---|---|
| | | Rubber | Rubber | | | SAN | |
| Constituent No. | % Rubber[2] | Particle Size[1] | Composition | Swelling Index | % AN[4] | $M_w$[5] | $M_n$[6] |
| A-1 | 16.1 | 0.5 | Solprene 308 ® brand Rubber[14] | * | 25 | * | * |
| A-2 | 16.2 | 0.5 | Solprene 308 ® brand Rubber[14] | * | 25 | * | * |
| A-3 | 11.7 | 0.55 | Solprene 308 ® brand Rubber[14] | 14 | 27 | 164,000 | 75,000 |
| A-4 | 10.6 | 0.58 | Anionically polymerized polybutadiene having a 5% solution viscosity in styrene of 31 centipoise | 12 | 28 | 149,000 | 72,000 |
| A-5 | 12 | 0.62 | Solprene 308 ® brand Rubber[14] | * | 25 | 187,000 | 60,000 |
| A-6 | 9.9 | 0.64 | Anionically polymerized polybutadiene having a 5% solution viscosity in styrene of 31 centipoise | 13 | 28 | 152,000 | 75,000 |
| A-7 | 12 | 0.65 | Solprene 308 ® brand Rubber[14] | * | * | 150,000 | * |
| A-8 | 7 | 0.7 | 50/50 blend of Solprene 308 ® and Diene 55 ® brands Rubber[14,15] | * | 28 | 171,000 | 62,000 |
| A-9 | 16.1 | 0.86 | Solprene 308 ® brand Rubber[14] | * | 25 | * | * |
| A-10 | 9.0 | 1.4 | Diene 55 ® brand Rubber[15] | * | 20 | * | * |
| A-11 | 8.0 | 4.0 | An anionically polymerized polybutadiene rubber. These particles have a g/r ratio of 0.92. | 7 | 30 | 182,000 | * |
| A-12 | 10.7 | 8.0 | Diene 55 ® brand Rubber[15] | 14 | 22 | 136,000 | * |

| Constituent No. | $T_y$[7] | $T_r$[9] | % E[9] | Izod[10] | Gloss[11] | Gardner Dart[12] | MFR[13] |
|---|---|---|---|---|---|---|---|
| A-1 | 6800 | 5400 | 10 | 1.6 | 33 | 20 | 2.8 |
| A-2 | 7300 | 5700 | 13 | 1.0 | 24 | 20 | 2.5 |
| A-3 | 7170 | 5700 | 26 | 1.3 | 70 | * | * |
| A-4 | 6830 | 5830 | 3 | 2.7 | 69 | * | 2.6 |
| A-5 | 7900 | * | * | 2.8 | 75 | * | * |
| A-6 | 6780 | 5330 | 6 | 3.5 | 61 | * | 2.4 |
| A-7 | 8200 | * | * | 2.0 | * | * | 3.3 |
| A-8 | 8355 | 5770 | 25 | 2.3 | 34 | 320 | 2.2 |
| A-9 | 5880 | * | 15 | 6.5 | * | * | 2.5 |
| A-10 | 6252 | 5122 | 68 | 3.2 | * | 318 | 2.0 |
| A-11 | 3300 | 4600 | 33 | 1.5 | * | * | 1.0 |
| A-12 | 4000 | 4300 | 37 | 2.0 | * | * | 4.0 |

Notes:
*Not measured.
[1]Particle size in microns ($\mu$).
[2]Weight percent of rubber in the constituent.
[3]Determined using as a swelling solvent a 50/50 blend of toluene and methyl ethyl ketone.
[4]Weight percent of AN in the SAN.
[5]Weight average molecular weight of the ungrafted SAN.
[6]Number average molecular weight of the ungrafted SAN.
[7]Tensile strength at yield in pounds per square inch.
[8]Tensile strength at rupture in pounds per square inch.
[9]Percent elongation.
[10]Notched Izod impact strength in foot pounds per inch of notch.
[11]Gardner gloss taken at 60°, in percent.
[12]Gardner dart impact resistance in inch-pounds.
[13]Melt flow rate in grams per 10 minutes.
[14]Solprene 308 ® is commercially available from the Phillips Petroleum Company.
[15]Diene 55 ® is commercially available from the Firestone Synthetic Rubber and Latex Co.

(b) Constituent B - Small Emulsion Particles

An aqueous latex containing 0.1μ particles of butadiene-styrene-acrylonitrile rubber (93-5-2) is heated while the graftable monomers (styrene and acrylonitrile), mercaptan, persulfate initiator and emulsifying agent are supplied. The latex, containing the SAN-grafted rubber particles as well as some ungrafted SAN is freeze coagulated, thawed, centrifuged, then air dried to reduce the water content below about 1 percent in the resultant powdery polymer composition. The small particle constitutent used herein is hereinafter referred to as Constituent B and has the following characteristics as listed in Table II, below.

cles and small particles. This latex is then grafted and recovered in the same manner as Constituent B, above.

When both small and large emulsion particles are desired in the resultant composition, all or part of both the small particle component and the large emulsion particle component are incorporated into ABS compositions via inclusion therein of amounts of the constituents listed in Table III, below. In examples where an increased ratio of small-to-large particles is desired in the resultant composition, amounts of Constituent B are added in addition to amounts of Constituent C in order to achieve desired sample compositions.

The two agglomerated particle constituents used herein are identified in Table III, below, where various characteristics of the constituents are given.

TABLE II

Small Emulsion Particle Constituent Characteristics

| Constituent No. | % Rubber[1] | Rubber Size[2] | Composition | Swelling Index[4] | SAN % AN[5] | $M_w$[6] | % Gel[7] | g/r[8] |
|---|---|---|---|---|---|---|---|---|
| B | 49 | 0.1 | Free radically polymerized butadiene/styrene/acrylonitrile (93/5/2) rubber | 22 | 28 | 100,000 | 78 | 0.60 |

[1]Weight percent of rubber in this constituent.
[2]Volume average particle size in microns (μ).
[4]Determined using toluene as a swelling solvent.
[5]Percent by weight of acrylonitrile in the SAN.
[6]Weight average molecular weight of the ungrafted SAN.
[7]Percent by weight of the composition that the rubber and grafted and occluded polymer make up.
[8]Ratio of the weight of grafted and occluded polymer to the weight of the rubber substrate to and in which it is grafted and occluded.

TABLE III

Characteristics of Constituents Containing Large and Small Emulsion Particles

| Constituent No. | % Rubber[1] | Rubber Small Particles Size[2] | Rubber Small Particles % of Rubber[2] | Rubber Large Particles Size[2] | Rubber Large Particles % of Rubber[3] | Rubber Composition | Swelling Index[4] | SAN % AN[5] | $M_w$[6] | % Gel[7] | G/R[8] |
|---|---|---|---|---|---|---|---|---|---|---|---|
| C-1 | 45.9 | 0.1 | 36 | 1.0 | 64 | Free radically polymerized butadiene/styrene/acrylonitrile (93/5/2) rubber | 23 | 28 | 100,000 | 73 | 0.60 |
| C-2 | 44.8 | 0.1 | 56 | 0.78 | 44 | Free radically polymerized butadiene/styrene/acrylonitrile (93/5/2) rubber | * | 28 | 100,000 | 77 | 0.72 |

*Not measured.
[1]Weight percent of rubber in this constituent.
[2]Volume average particle size in microns (μ).
[3]Percent by weight of the total rubber in the constituent that particle component makes up.
[4]Determined using toluene as a swelling solvent.
[5]Percent by weight of acrylonitrile in the SAN.
[6]Weight average molecular weight of the ungrafted SAN.
[7]Percent by weight of the composition that the rubber and grafted and occluded polymer make up.
[8]Ratio of the weight of grafted and occluded polymer to the weight of the rubber substrate to and in which it is grafted and occluded.

(c) Constituent C - Combination of Small and Large Emulsion Particles

To an aqueous latex containing 0.1μ particles of butadiene-styrene-acrylonitrile rubber (93-5-2) is added about 0.75 weight percent based on weight rubber of an agglomerating agent consisting of a polybutadiene core with a shell of ethyl acrylate-methacrylic acid (92-8) copolymer. A portion of the particles agglomerate to give a bimodal particle size distribution of large parti- (d) Constituent D - Additional Matrix SAN Interpolymer Amounts of mass-polymerized poly(styrene-acrylonitrile) (SAN) interpolymer in the form of extruded pellets, are added to sample compositions to achieve the desired rubber concentrations in the final composition. The two SAN constituents used herein are identified in Table IV, below, where various characteristics of these constituents are given.

TABLE IV

Matrix SAN Constituents

| Constituent No. | $M_w$[1] | $M_n$[2] | Percent AN[3] |
|---|---|---|---|
| D-1 | 85,000 | 34,000 | 28 |
| D-2 | 155,000 | * | 25 |

*Not measured.
[1]Weight average molecular weight.
[2]Number average molecular weight.
[3]Percent by weight of acrylonitrile in the SAN.

The necessary constituents and amounts thereof to achieve the desired rubber concentrations and rubber particle distributions in the resultant ABS composition are selected, the powders and/or pellets tumble blended, then fed into and compounded in a 0.8 inch twin-screw Welding Engineers compounder, then extruded in the form of pellets of ABS. The following tables will indicate for various ABS compositions the amounts of the various above-identified constituents which are used to make the composition and the percentage of the total rubber that each particle type makes up as well as the physical properties achieved in the resultant compositions.

EXAMPLES 1-5

The Effect of Varying Particle Sizes and Types

In Table V, below, Examples 1, 2, 3 and 4 illustrate the effects of varying the relative amounts of large and small emulsion particles in ABS compositions while Example 5 shows the effect of using large mass particles in place of large emulsion particles in those bimodal ABS compositions.

TABLE V

The Effect of Particle Size and Types

| Example Composition No. | % Rubber in ABS | Small Particle Rubber Component | | Large Emulsion Particle Component | | Large Mass Particle Component | | Properties | | Constituents Used to Prepare Example Compositions[5] |
|---|---|---|---|---|---|---|---|---|---|---|
| | | Size[1] | % of Rubber[2] | Size[1] | % of Rubber[2] | Size[1] | % of Rubber[2] | Izod[3] | Gloss[4] | |
| 1* | 17 | 0.1 | 100 | — | — | — | — | 0.43 | 96 | 35% B, 65% D-1 |
| 2* | 17 | 0.1 | 75 | 1.0 | 25 | — | — | 1.7 | 93 | 21% B, 15% C-1, 64% D-1 |
| 3* | 17 | 0.1 | 50 | 1.0 | 50 | — | — | 3.9 | 92 | 8% B, 29% C-1, 63% D-1 |
| 4* | 17 | 0.1 | 36 | 1.0 | 64 | — | — | 4.6 | 93 | 37% C-1, 63% D-1 |
| 5* | 17 | 0.1 | 50 | — | — | 0.86 | 50 | 5.3 | 15 | 53% A-9, 17% B, 30% D-1 |

*Indicates comparative example, not an example of the present invention.
[1]Particle size in microns (μ).
[2]Percent by weight of the total rubber in the composition that particle component makes up.
[3]Notched Izod impact strength in foot pounds per inch of notch.
[4]Gardner gloss taken at 60°, in percent.
[5]Constituents, as identified in Tables I-IV above, and percentages by weight thereof in the Example compositions.

In Comparative Examples 1, 2, 3 and 4, having small particles combined with varying amounts of large emulsion particles, as the percentage of small particles decreases, the Izod goes up while gloss decreases slightly. In Example 5, when 50 percent of the particles are mass particles, the gloss is much reduced while the Izod is high.

EXAMPLES 6 and 7

Trimodal vs. Bimodal Particle Distributions

In Table VI, below, Comparative Examples 3 and 5 reproduced from Table V above, show the effect of replacing all of the large emulsion particles with large mass particles holding the small emulsion particles constant. Examples 6 and 7 are ABS compositions having trimodal particle size distributions. In Example 6, the small particle component is the same as in Examples 3 and 5 and half of the large emulsion particles are replaced with large mass particles. In Example 7, the large mass particle component is the same as in Example 5 while some of the small particles have been replaced with large emulsion particles.

TABLE VI

Trimodal Particle Size Distributions

| Example Composition No. | % Rubber in ABS | Small Particle Rubber Component | | Large Emulsion Particle Component | | Large Mass Particle Component | | Properties | | Constituents Used to Prepare Example Compositions[5] |
|---|---|---|---|---|---|---|---|---|---|---|
| | | Size[1] | % of Rubber[2] | Size[1] | % of Rubber[2] | Size[1] | % of Rubber[2] | Izod[3] | Gloss[4] | |
| 3* | 17 | 0.1 | 50 | 1.0 | 50 | — | — | 3.9 | 92 | 8% B, 29% C-1, 63% D-1 |
| 5* | 17 | 0.1 | 50 | — | — | .86 | 50 | 5.3 | 15 | 53% A-9, 17% B, 30% D-1 |
| 6 | 17 | 0.1 | 50 | 1.0 | 25 | .86 | 25 | 5.4 | 27 | 26% A-9, 13% B, 14% C-1, 47% D-1 |
| 7 | 17 | 0.1 | 18 | 1.0 | 32 | .86 | 50 | 6.9 | 15 | 53% A-9, 18% C-1, 29% D-1 |

*Indicates comparative example, not an example of the present invention.
[1]Particle size in microns (μ).
[2]Percent by weight of the total rubber in the composition that particle component makes up.
[3]Notched Izod impact strength in foot pounds per inch of notch.
[4]Gardner gloss taken at 60°, in percent.
[5]Constituents, as identified in Tables I-IV above, and percentages by weight thereof in the Example compositions.

Table VI, above, shows the result of replacing part of the particles of a bimodal particle distribution with a third particle component. Instead of increases in either gloss or Izod, accompanied by a loss in the other, as would be expected in view of trends shown in Table V, above, and as taught in the prior art, Examples 6 and 7 do not exhibit mere trade-offs of gloss and Izod. Example 6 exhibits better gloss than Example 5 without the accompanying loss of Izod which might be expected when large mass particles are replaced by large emulsion particles. On the other hand, comparing Example 5 to Example 7, the Izod improves without loss of gloss, in spite of replacing small particles with large ones.

EXAMPLES 8 and 9

Trimodal vs. Bimodal Particle Distribution

In Table VII, below, Comparative Examples 2 and 9 show the effect of replacing all of the large emulsion particles with large mass particles having an average diameter of 0.62μ, holding the small particle component constant. In Example 8, an example of the present invention, both large mass and large emulsion particles are combined with the small particles in a 17 percent rubber ABS composition.

Example 8 in Table VII, above, again shows that the combination of large mass and large emulsion particles with small particles in an ABS composition give a good combination of gloss and toughness, compared to Examples 2 and 9 having only one type of large particle.

EXAMPLES 10–17

Various ABS Compositions

Table VIII, below, gives the physical properties of several types of ABS compositions. Some of the compositions (Examples 10, 12, 14 and 16) are bimodal ABS compositions, combining the various mass components with small particle components to achieve 17 percent rubber in the ABS. Some of the compositions (Examples 11, 13, 15 and 17) are examples of the present invention, combining the various mass components with small and large emulsion particles. These examples show the improvements obtained in the practice of the present invention. It should be noted that Example compositions 5 and 7 have been re-numbered 16 and 17 and included in Table VIII for purposes of comparison.

TABLE VII

Trimodal Particle Size Distributions

| Example Composition No. | % Rubber in ABS | Small Particle Rubber Component Size[1] | Small Particle Rubber Component % of Rubber[2] | Large Emulsion Particle Component Size[1] | Large Emulsion Particle Component % of Rubber[2] | Large Mass Particle Component Size[1] | Large Mass Particle Component % of Rubber[2] | Properties Izod[3] | Properties Gloss[4] | Constituents Used to Prepare Example Compositions[5] |
|---|---|---|---|---|---|---|---|---|---|---|
| 2* | 17 | 0.1 | 75 | 1.0 | 25 | — | — | 1.7 | 93 | 21% B, 15% C-1, 64% D-1 |
| 8 | 17 | 0.1 | 75 | 1.0 | 15 | 0.62 | 10 | 2.1 | 87 | 14% A-5, 23% B, 9% C-1, 54% D-1 |
| 9* | 17 | 0.1 | 75 | — | — | 0.62 | 25 | 2.1 | 75 | 35% A-5, 26% B, 39% D-1 |

*Indicates comparative example, not an example of the present invention.
[1] Particle size in microns (μ).
[2] Percent by weight of the total rubber in the composition that the component makes up.
[3] Notched Izod impact strength in foot pounds per inch of notch.
[4] Gardner gloss taken at 60°, in percent.
[5] Constituents, as identified in Tables I–IV above, and percentages by weight thereof in the Example compositions.

TABLE VIII

Various 17% Rubber ABS Compositions

| Example No. | % Rubber in ABS | Small Particle Rubber Component Size[1] | Small Particle Rubber Component % of Rubber[2] | Large Emulsion Particle Component Size[1] | Large Emulsion Particle Component % of Rubber[2] | Large Mass Particle Component Size[1] | Large Mass Particle Component % of Rubber[2] | Properties Ty[6] | Properties Tr[7] |
|---|---|---|---|---|---|---|---|---|---|
| | 17 | — | — | — | — | | | | |
| 11* | 17 | 0.1 | 50 | — | — | 0.5 | 50 | 6400 | 5100 |
| 12 | 17 | 0.1 | 18 | 1.0 | 32 | 0.5 | 50 | 6200 | 5700 |
| | 17 | — | — | — | — | | | | |
| 14* | 17 | 0.1 | 50 | — | — | 0.5 | 50 | 6600 | 5300 |
| 15 | 17 | 0.1 | 18 | 1.0 | 32 | 0.5 | 50 | 5400 | 5200 |
| | 17 | — | — | — | — | | | | |
| 17* | 17 | 0.1 | 69 | — | — | 0.7 | 31 | 6400 | 5100 |
| 18 | 17 | 0.1 | 25 | 1.0 | 44 | 0.7 | 31 | 6100 | 5200 |
| | 17 | — | — | — | — | | | | |
| 20* | 17 | 0.1 | 50 | — | — | 0.86 | 50 | 6300 | 5000 |
| 21 | 17 | 0.1 | 18 | 1.0 | 32 | 0.86 | 60 | 6100 | 5100 |

| Example No. | % E[9] | Properties Izod[3] | Properties Gloss[4] | MFR[8] | Constituents Used to Prepare Example Compositions[5] |
|---|---|---|---|---|---|
| 11* | 29 | 1.5 | 44 | 3.8 | 53% A-1, 17% B, 30% D-1 |
| 12 | 35 | 4.6 | 49 | 4.4 | 53% A-1, 18% C-1, 29% D-1 |
| 14* | 21 | 1.2 | 51 | 2.6 | 53% A-2, 17% B, 30% D-1 |
| 15 | 40 | 4.6 | 55 | 2.9 | 53% A-2, 18% C-1, 29% D-1 |
| 17* | 28 | 6.9 | 36 | 1.2 | 74% A-8, 24% B, 2% D-1 |
| 18 | 50 | 8.6 | 37 | 2.1 | 74% A-8, 26% C-1 |
| 20* | 33 | 5.3 | 15 | 3.3 | 53% A-9, 17% B, 30% D-1 |

TABLE VIII-continued

| Various 17% Rubber ABS Compositions | | | | | |
|---|---|---|---|---|---|
| 21 | 55 | 6.9 | 15 | 4.1 | 53% A-9, 18% C-1, 29% D-1 |

*Indicates comparative example, not an example of the present invention.
[1] Particle size in microns ($\mu$).
[2] Percent by weight of the total rubber in the composition that particle component makes up.
[3] Notched Izod impact strength in foot pounds per inch of notch.
[4] Gardner gloss taken at 60°, in percent.
[5] Constituents, as identified in Tables I-IV above, and percentages by weight thereof in the Example compositions.
[6] Tensile strength at yield in pounds per square inch.
[7] Tensile strength at rupture in pounds per square inch.
[8] Melt flow rate in grams per 10 minutes.
[9] Percent elongation.

EXAMPLES 22-26

Various 14% Rubber ABS Compositions

Examples 18 through 22 in Table IX, below, show various bimodal and trimodal ABS compositions with 14 percent rubber, illustrating the benefits of the present invention at that rubber level.

can be achieved at 14 percent rubber levels with 4$\mu$ large mass particles.

EXAMPLES 23-29

Additional Trimodal ABS Compositions

Examples 23 through 29, as shown in Table X, below, illustrate that the SAN interpolymer (ungrafted) pro-

TABLE IX

| | | 14% Rubber ABS Compositions | | | | | | | | |
|---|---|---|---|---|---|---|---|---|---|---|
| | | Small Particle Rubber Component | | Large Emulsion Particle Component | | Large Mass Particle Component | | Properties | | Constituents Used to Prepare Example Compositions[5] |
| Example No. | % Rubber in ABS | Size[1] | % of Rubber[2] | Size[1] | % of Rubber[2] | Size[1] | % of Rubber[2] | Izod[3] | Gloss[4] | |
| 18* | 14 | 0.1 | 27 | — | — | 0.62 | 73 | 3.6 | 49 | 85% A-5, 8% B, 7% D-1 |
| 19* | 14 | 0.1 | 36 | 1.0 | 64 | — | — | 1.7 | 92 | 30% C-1, 70% D-1 |
| 20 | 14 | 0.1 | 27 | 1.0 | 48 | 0.62 | 25 | 3.6 | 83 | 29% A-5, 23% C-1, 48% D-1 |
| 21 | 14 | 0.1 | 10 | 1.0 | 18 | 0.62 | 72 | 4.7 | 49 | 84% A-5, 9% C-1, 7% D-1 |
| 22 | 14 | 0.1 | 33 | 1.0 | 60 | 4.0 | 7 | 2.4 | 65 | 12% A-11, 28% C-1, 59% D-1 |

*Indicates comparative example, not an example of the present invention.
[1] Particle size in microns ($\mu$).
[2] Percent by weight of the total rubber in the composition that particle component makes up.
[3] Notched Izod impact strength in foot pounds per inch of notch.
[4] Gardner gloss taken at 60°, in percent.
[5] Constituents, as identified in Tables I-IV above, and percentages by weight thereof in the Example compositions.

In Table IX, above, Examples 18 and 19 show that when all of the large mass particles in a 14 percent rubber bimodal ABS composition are replaced with large emulsion particles, the toughness is decreased and the gloss is improved. Example 20, however, shows that when only part of the mass particles of Example 18 are replaced with large emulsion particles, the toughness is maintained at the same good level while the gloss is increased significantly. On the other hand, Example 21 shows that replacing part of the small particles of Example 18 with large emulsion particles improves the toughness without a decrease in the gloss. Example 22 shows that good combinations of toughness and gloss duced in the preparation of the grafted mass particles can have various molecular weights. The molecular weights shown in Table X are conveniently determined by Gel Permeation Chromatography (GPC) a molecular weight determination technique well known in the art.

Table X, below, illustrates the desirable characteristics of the various trimodal ABS compositions, (i.e., toughness, gloss and processability). Toughness is shown by tensile strengths, percent elongation, notched Izod impact resistance and Gardner Dart Impact Resistance. Gloss is shown by Gardner gloss measurements. Processability is shown by melt flow rates.

TABLE X

| Example No. | % Rubber in ABS | Molecular Weight of the Rigid Phase[11] | Small Particle Rubber Component | | Large Emulsion Particle Component | | Large Mass Particle Component | |
|---|---|---|---|---|---|---|---|---|
| | | | Size[1] | % of Rubber[2] | Size[1] | % of Rubber[2] | Size[1] | % of Rubber[2] |
| 23 | 17 | 164,000 | 0.1 | 18 | 1.0 | 32 | 0.55 | 50 |
| 24 | 17 | 149,000 | 0.1 | 18 | 1.0 | 32 | 0.58 | 50 |
| 25 | 17 | 149,000 | 0.1 | 27 | 1.0 | 48 | 0.58 | 25 |
| 26 | 14 | 152,000 | 0.1 | 18 | 1.0 | 32 | 0.64 | 50 |
| 27 | 14 | 152,000 | 0.1 | 27 | 1.0 | 48 | 0.64 | 25 |
| 28 | 17 | 150,000 | 0.1 | 37 | 0.8 | 30 | 0.65 | 33 |
| 29 | 17 | 180,000 | 0.1 | 50 | 0.8 | 40 | 1.4 | 10 |

| | Properties | | | |
| Example | | | Gardner | Constituents Used to Prepare |

TABLE X-continued

| No. | Ty[6] | Tr[7] | % E[9] | Izod[3] | Gloss[4] | MFR[8] | Dart[10] | Example Compositions[5] |
|---|---|---|---|---|---|---|---|---|
| 23 | 6600 | 5200 | 15 | 4.4 | 50 | 2.3 | 320+ | 73% A-3, 18% C-1, 9% D-1 |
| 24 | 6200 | 5100 | 11 | 7.2 | 58 | 2.0 | 320+ | 80% A-4, 18% C-1, 1% D-1 |
| 25 | 6100 | 5000 | 15 | 6.0 | 82 | 3.4 | 320+ | 40% A-4, 28% C-1, 32% D-1 |
| 26 | 6600 | 5300 | 12 | 5.3 | 61 | 2.8 | 320+ | 71% A-6, 15% C-1, 14% D-1 |
| 27 | 6500 | 5200 | 24 | 3.9 | 82 | 4.8 | 320+ | 35% A-6, 23% C-1, 42% D-1 |
| 28 | 7015 | 5260 | 42 | 4.6 | 80 | — | — | 47% A-7, 25% C-2, 28% D-1 |
| 29 | 6590 | 5040 | 30 | 4.5 | 61 | — | — | 19% A-10, 33% C-2, 48% D-1 |

[1]Average particle size of the component in microns ($\mu$).
[2]Percent by weight of the total rubber in the composition that the component makes up.
[3]Notched Izod impact strength in foot pounds per inch notch.
[4]Gardner gloss taken at 60°, in percent.
[5]Constituents, as identified in Tables I-IV above, and percentages by weight thereof in the Example Compositions.
[6]Tensile strength at yield in pounds per square inch.
[7]Tensile strength at rupture in pounds per square inch.
[8]Melt flow rate in grams per 10 minutes.
[9]Percent elongation.
[10]Gardner Dart Impact Resistance in inch-pounds.
[11]Molecular weight of the rigid phase (ungrafted) SAN produced in grafting the mass rubber particles, as determined by gel permeation chromatography.

EXAMPLES 34 and 35

Controlled Gloss ABS

For some uses, ABS materials having a matte finish (i.e., low gloss) are desired. In these cases, compositions according to the present invention can be satisfactorily utilized, in that they exhibit improved toughness at low gloss levels as well as high gloss. The gloss is greatly affected by amount and size of the large mass particle, and the trimodal particle distribution provides good toughness. Table XI below shows the benefit of trimodal ABS at low gloss levels.

TABLE XI

Low Gloss ABS

| Example No. | % Rubber in ABS | Small Particle Rubber Component | | Large Emulsion Particle Component | | Large Mass Particle Component | | Properties | | Dart[10] | MFR[8] | Constituents Used to Prepare Example Compositions[5] |
|---|---|---|---|---|---|---|---|---|---|---|---|---|
| | | Size[1] | % of Rubber[2] | Size[1] | % of Rubber[2] | Size[1] | % of Rubber[2] | Izod[3] | Gloss[4] | | | |
| 30* | 17 | 0.1 | 50 | — | — | 8.0 | 50 | 7.5 | 11 | 160 | 1.8 | 40% A-12, 26% B, 34% D-2 |
| 31 | 17 | 0.1 | 18 | 1.0 | 32 | 8.0 | 50 | 8.1 | 11 | 180 | 2.4 | 40% A-12, 28% C-1, 32% D-2 |

*Indicates comparative example, not an example of the present invention.
[1]Particle size in microns ($\mu$).
[2]Percent by weight of the total rubber in the composition that the component makes up.
[3]Notched Izod impact strength in foot pounds per inch notch.
[4]Gardner gloss taken at 60°, in percent.
[5]Constituents, as identified in Tables I-IV above, and percentages by weight thereof in the Example compositions.
[8]Melt flow rate in grams per 10 minutes.
[10]Gardner Dart Impact Resistance in inch-pounds.

As shown above in Examples 30 and 31 of Table XI, replacing part of the small particles of a low gloss bimodal ABS with large emulsion particles gives improved toughness at the same low gloss level.

As is apparent from the foregoing specification, the present invention is susceptible of being embodied with various changes and modifications to achieve various desired characteristics in the final compositions. For this reason it is to be understood that all of the foregoing is intended to be merely illustrative and not restricting or otherwise limiting the scope of the present invention except as it is set forth and defined in the following claims.

What is claimed is:

1. An improved rubber-modified, impact-resistant polymeric composition comprising:
    (a) a matrix comprising an interpolymer comprising monovinylidene aromatic monomer and ethylenically unsaturated nitrile monomer polymerized therein; and
    (b) dispersed in such matrix in the form of discrete particles, from about 5 to about 40 weight percent, based on weight polymeric composition, of elastomeric material (rubber), wherein the improvement comprises the dispersed rubber comprising the following three rubber components;
    (1) a small particle rubber component being from about 1 to about 94 weight percent of the rubber, the particles of this component having a volume average diameter of from about 0.05 to about 0.25 microns ($\mu$);
    (2) a large emulsion particle rubber component being from about 1 to about 80 weight percent of the rubber, the particles of this component having a volume average diameter of from about 0.4 to about 2$\mu$ produced by emulsion polymerization; and
    (3) a large mass particle rubber component being from about 5 to about 95 weight percent of the rubber, the particles of this component having a volume average diameter of from about 0.5 to about 10$\mu$ produced by mass, mass-solution or mass-suspension polymerization.

2. A polymeric composition according to claim 1 wherein rubber component (1) has a volume average diameter of from about 0.08 to about 0.25$\mu$ and is from about 25 to about 75 weight percent of the rubber; rubber component (2) has a volume average diameter of from about 0.4 to about 1.5$\mu$ and is from about 10 to about 50 weight percent of the rubber; and rubber component (3) has a volume average diameter of from about 0.6 to about 1.5μ and is from about 5 to about 50 weight percent of the rubber.

3. The polymeric composition according to claim 1 comprising at least about 65 percent by weight of an interpolymer comprising monovinylidene aromatic monomer and ethylenically unsaturated nitrile monomer polymerized therein, the interpolymer comprising from about 15 to about 35 weight percent ethylenically unsaturated nitrile monomer polymerized therein based on the weight monovinylidene aromatic monomer plus ethylenically unsaturated nitrile monomer.

4. The polymeric composition according to claim 3 wherein the monovinylidene aromatic monomer is styrene and the ethylenically unsaturated nitrile monomer is acrylonitrile.

5. The polymeric composition according to claim 4 comprising from about 1 to about 40 weight percent methyl methacrylate polymerized therein based on weight styrene, acrylonitrile and methyl methacrylate monomers polymerized therein.

6. The composition according to claim 1 wherein rubber component (1) is produced via an emulsion polymerization process, rubber component (2) is an agglomerate of smaller, emulsion-produced particles and rubber component (3) is anionically polymerized rubber.

7. The composition according to claim 1 wherein the dispersed rubber consists essentially of:
   (1) a small particle rubber component being from about 20 to about 40 weight percent of the rubber, the particles of this component having a volume average diameter of from about 0.08 to about 0.2 microns (μ) and consisting of emulsion produced rubber;
   (2) a large emulsion particle rubber component being from about 10 to about 25 weight percent of the rubber, the particles of this component having a volume average diameter of from about 0.7 to about 1.3μ, such particles resulting from the agglomeration of smaller emulsion-produced rubber particles; and
   (3) a large mass particle rubber component being from about 50 to 70 weight percent of the rubber, the particles of this component having a volume average diameter of from about 0.6 to about 0.9μ.

8. The composition according to claim 1 wherein the dispersed rubber consists essentially of:
   (1) a small particle rubber component being from about 25 to about 35 weight percent of the rubber, the particles of this component having a volume average diameter of from about 0.08 to about 0.2 microns (μ) and consisting of emulsion produced rubber;
   (2) a large emulsion particle rubber component being from about 25 to about 35 weight percent of the rubber, the particles of this component having a volume average diameter of from about 0.6 to about 1.3μ, such particles resulting from the agglomeration of smaller emulsion-produced rubber particles; and
   (3) a large mass particle rubber component being from about 35 to about 50 weight percent of the rubber, the particles of this component having a volume average diameter of from about 0.6 to about 0.9μ.

9. The composition according to claim 1 wherein a matte finish is desired, the dispersed rubber consisting essentially of:
   (1) a small particle rubber component being from about 5 to about 40 weight percent of the rubber, the particles of this component having a volume average diameter of from about 0.08 to about 0.25 microns (μ) and consisting of emulsion-produced rubber;
   (3) a large mass particle rubber component being from about 25 to about 80 weight percent of the rubber, the particles of this component having a volume average diameter of from about 1 to about 8μ.

10. The composition according to claim 1 comprising from about 15 to about 25 weight percent rubber, wherein the dispersed rubber consists essentially of:
   (1) a small particle rubber component being from about 10 to about 20 weight percent of the rubber, the particles of this component having a volume average diameter of from about 0.08 to about 0.2 microns (μ) and consisting of emulsion-produced rubber;
   (2) a large emulsion particle rubber component being from about 10 to about 20 weight percent of the rubber, the particles of this component having a volume average diameter of from about 0.7 to about 1.3μ, such particles resulting from the agglomeration of smaller emulsion-produced rubber particles; and
   (3) a large mass particle rubber component being from about 70 to about 80 weight percent of the rubber, the particles of this component having a volume average diameter of from about 0.65 to about 1.4μ.

* * * * *

UNITED STATES PATENT AND TRADEMARK OFFICE
CERTIFICATE OF CORRECTION

PATENT NO. : 4,713,420

DATED : December 15, 1987

INVENTOR(S) : David E. Henton

It is certified that error appears in the above-identified patent and that said Letters Patent is hereby corrected as shown below:

Title page, line 3 of the Abstract, following "is" insert therefore --a--.

Col. 1, line 60, following the word "polymerization" insert therefore --process--.

Col. 7, line 42, "2-methyl-4chlorostyrene" should read --2-methyl-4-chlorostyrene--.

Col. 8, lines 55-57, delete "G. R. McGowan and Vol. 89, Issue 1 of The Journal of Colloid and Interface Science, 1982 at pages 94 through 96".

Col. 20, Table VIII, please see attached page for changes.

Col. 21, line 15, "EXAMPLES 22-26" should read --EXAMPLES 18-22--.

Col. 23, line 20, "EXAMPLES 34-35" should read --EXAMPLES 30-31--.

Signed and Sealed this

Eighteenth Day of October, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,713,420

DATED : December 15, 1987

INVENTOR(S) : David E. Henton

Page 2 of 3

It is certified that error appears in the above-identified patent and that said Letters Patent is hereby corrected as shown below:

Col. 26, line 24, following "paragrah (1)" which ends "emulsion-produced rubber;" insert therefore:

--(2) a large emulsion particle rubber component being from about 5 to about 40 weight percent of the rubber, the particles of this component having a volume average diameter of from about 0.6 to about 2µ, such particles resulting from the agglomeration of smaller emulsion-produced rubber particles; and--.

TABLE VIII

Various 17% Rubber ABS Compositions

| Example No. | % Rubber in ABS | Small Particle Emulsion Rubber Component Size¹ | % of Rubber² | Large Particle Component Size¹ | % of Rubber² | Large Mass Particle Component Size¹ | % of Rubber² | Ty⁶ | Tr⁷ | %E⁹ | Izod³ | Gloss⁴ | MFR⁸ | Constituents Used to Prepare Example Compositions⁵ |
|---|---|---|---|---|---|---|---|---|---|---|---|---|---|---|
| 10* | 17 | 0.1 | 50 | - | - | 0.5 | 50 | 6400 | 5100 | 29 | 1.5 | 44 | 3.8 | 53% A-1, 17% B, 30% D-1 |
| 11 | 17 | 0.1 | 18 | 1.0 | 32 | 0.5 | 50 | 6200 | 5700 | 35 | 4.6 | 49 | 4.4 | 53% A-1, 18% C-1, 29% D-1 |
| 12* | 17 | 0.1 | 50 | - | - | 0.5 | 50 | 6600 | 5300 | 21 | 1.2 | 51 | 2.6 | 53% A-2, 17% B, 30% D-1 |
| 13 | 17 | 0.1 | 18 | 1.0 | 32 | 0.5 | 50 | 5400 | 5200 | 40 | 4.6 | 55 | 2.9 | 53% A-2, 18% C-1, 29% D-1 |
| 14* | 17 | 0.1 | 69 | - | - | 0.7 | 31 | 6400 | 5100 | 28 | 6.9 | 36 | 1.2 | 74% A-8, 24% B, 2% D-1 |
| 15 | 17 | 0.1 | 25 | 1.0 | 44 | 0.7 | 31 | 6100 | 5200 | 50 | 8.6 | 37 | 2.1 | 74% A-8, 26% C-1 |
| 16* | 17 | 0.1 | 50 | - | - | 0.86 | 50 | 6300 | 5000 | 33 | 5.3 | 15 | 3.3 | 53% A-9, 17% B, 30% D-1 |
| 17 | 17 | 0.1 | 18 | 1.0 | 32 | 0.86 | 60 | 6100 | 5100 | 55 | 6.9 | 15 | 4.1 | 53% A-9, 18% C-1, 29% D-1 |

\* Indicates comparative example, not an example of the present invention.
1 Particle size in microns (μ).
2 Percent by weight of the total rubber in the composition that particle component makes up.
3 Notched Izod impact strength in foot pounds per inch of notch.
4 Gardner gloss taken at 60°, in percent.
5 Constituents, as identified in Tables I-IV above, and percentages by weight thereof in the Example compositions.
6 Tensile strength at yield in pounds per square inch.
7 Tensile strength at rupture in pounds per square inch.
8 Melt flow rate in grams per 10 minutes.
9 Percent elongation.